July 6, 1937.   J. L. FINCH   2,085,743
CRYSTAL CONTROLLED GENERATOR
Filed Jan. 26, 1934
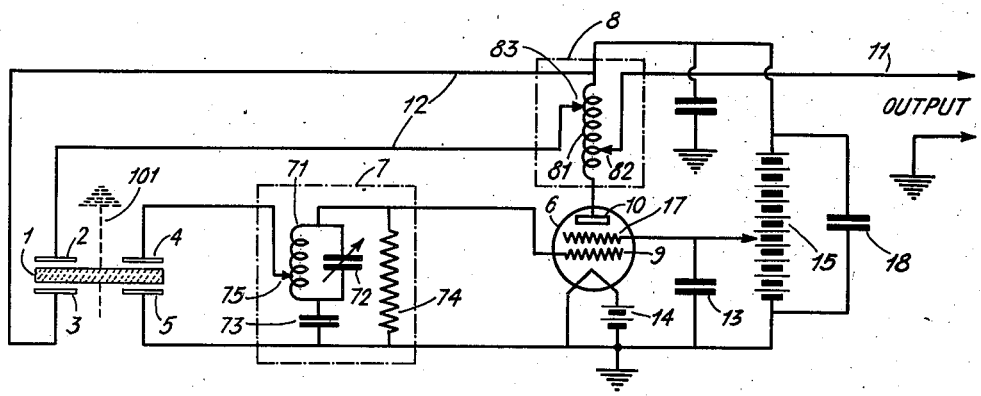
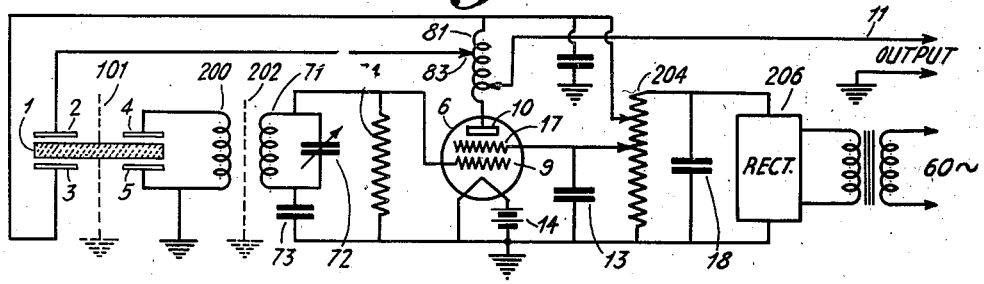
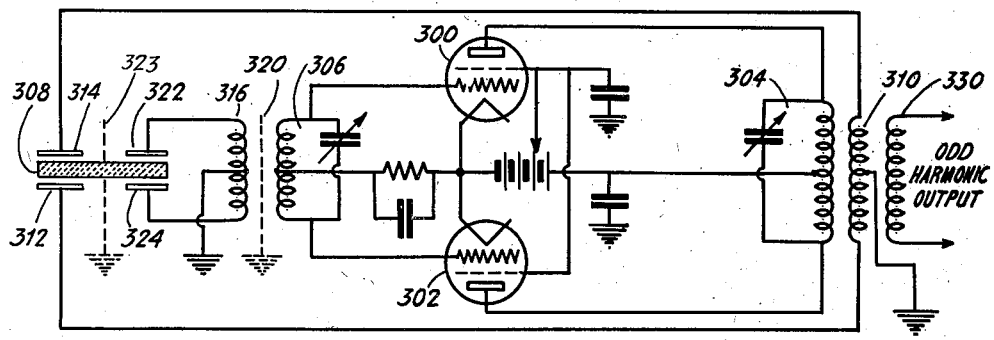
INVENTOR
JAMES L. FINCH
BY
ATTORNEY Patented July 6, 1937

2,085,743

UNITED STATES PATENT OFFICE 2,085,743

CRYSTAL CONTROLLED GENERATOR

James L. Finch, Patchogue, N. Y., assignor to Radio Corporation of America, a corporation of Delaware Application January 26, 1934, Serial No. 708,368

4 Claims. (Cl. 250—36)

My present invention relates to crystal controlled oscillation generators.

It is frequently desirous of producing energy harmonically related in frequency to the fundamental thickness vibration of a piezo-electric crystal. This has been accomplished in the past by the use of a frequency multiplier following a crystal controlled oscillation generator, the frequency multiplier serving to distort waves from the generator and from the distorted output of the multiplier desired harmonics could be picked off. Because of the complexity of the equipment required such an arrangement has proven disadvantageous for inexpensive low powered installations and for, particularly, constant high frequency mobile equipment. Accordingly, my present invention has as its prime object the provision of a crystal controlled oscillation generator which is particularly simple and which produces in the generator itself high powered energy of a frequency harmonically related to the fundamental thickness vibration frequency of a frequency controlling piezo-electric crystal.

A further and more specific object of my present invention is to provide a crystal controlled oscillation generator wherein the frequency controlling crystal oscillates at a frequency corresponding to an odd harmonic of the fundamental thickness vibration frequency thereof and wherein the output at the odd harmonic frequency is at relatively high power.

Other objects as well as advantages of my present invention will be apparent upon a reading of the more detailed description thereof as given hereinafter with the aid of the accompanying drawing. The drawing, by the way, is not to be considered in any way limitative of my present invention but is merely given by way of illustrating the principles thereof and suitable means by which its useful objects may be effected.

Briefly,

Figure 1 illustrates a preferred form of my present invention wherein a four electrode piezo-electric crystal is used as a coupling agent between the output circuit of a vacuum tube oscillation generator and an harmonically tuned input circuit of the generator whereby energy fed back through the crystal by piezo-electric action causes the production of relatively high powdered odd harmonic frequency oscillations;

Figure 2 is a modification showing another method of coupling the crystal to the harmonic input circuit of my improved crystal controlled oscillation generator; and, Figure 3 is a wiring diagram of a pushpull modification.

Referring in greater detail to Figure 1, I preferably use a screen grid tube 6 having an inductive plate load or output circuit in the form of an inductance coil 81. The input circuit within the rectangle 7 consists essentially of a parallel tuned circuit formed of coil 71 and variable condenser 72. Grid bias for the grid 9 of tube 6 is provided by the action of resistance 74 in combination with the grid leak condenser 73. The filament or cathode of the tube 6 may be energized by D. C. source 14 although any other form of cathode and heating means therefor may be used. The screen grid 17 is grounded for high frequency currents by the action of by-passing condenser 13 and plate potential is applied to the plate 10 through the coil 81 from a source of plate voltage 15, here shown as a battery shunted by a high frequency by-passing condenser 18.

The frequency controlling piezo-electric crystal 1 is provided with four electrodes 2, 3, 4, 5 respectively, it being understood that electrodes 3 and 5 may be combined and connected directly to ground, if desired, in which case the connection to electrode 3, as shown, would be removed. A static shield 101 separates the electrodes 2 and 3 at one end of the crystal from the electrodes 4 and 5 at the other end. This shield prevents any possible capacitve transfer of energy from the anode 6 to the grid 9. Hence feedback is obtained solely due to the piezo-electric action of the frequency controlling crystal 1. The plate inductance 81 is tapped at some suitable point 82 whereby output energy may be derived from the lead 11 and the grounded conductor as illustrated.

The output inductor 81 is also tapped at another suitable point 83, preferably a low voltage point with respect to the oscillation voltages, for feedback through the crystal 1 to the grid 9. The grid circuit consisting of inductor 71 and variable capacitor 72 are arranged to resonate at the desired frequency of oscillation and in particular at any odd harmonic frequency relative to the fundamental thickness vibration frequency of the piezo-electric crystal 1.

As already pointed out, capacitor 73 is a blocking condenser of low impedance with respect to the frequency of oscillation and is used to prevent direct current from flowing between the grid 9 and the filament of tube 6 through the inductor 71. The resistor 74 is a grid leak resistor which builds up a direct current voltage for giving the proper grid bias.

Crystal electrode 4 is connected to inductor 71 at a point 75 in such a way that the impedance connected between the point 75 and the cathode suitably matches the output impedance of the crystal.

The arrangement shown in Figure 2 is quite similar to that given in Figure 1. However, it will be noted that crystal electrodes 4, 5 are connected together by the inductive coupling coil 200 which is coupled to the input circuit coil 71 inductively. Capacitive transfer between the inductive coupling coils 200 and 71 is prevented by means of another grounded shield 202. The lower end of coil 200 may be grounded as illustrated, or if desired in the alternative, the upper end of coil 200 may be grounded. As a still further modification, any intermediate point, and in particular the midpoint of coil 200, may be grounded rather than either end. Also, in Figure 2, the screen grid and plate voltages are taken from a potentiometer 204 supplied with smoothed rectified current from any suitable rectifier 206.

In both the arrangements shown in Figures 1 and 2, the output may be used in any suitable way for reception of high frequency waves or for the transmission of signals. In the latter case modulating potentials may be applied to any one of the tube electrodes in ways known to the art.

The manner in which the principles of my present invention may be carried out in connection with a pushpull arrangement of tubes is illustrated in Figure 3. Turning to it, vacuum tubes or electron discharge devices 300, 302 are provided with a tuned output circuit 304 which may simply be an inductance coil and with a tunable input circuit 306 tuned to some harmonic frequency of the fundamental thickness vibration frequency of the piezo-electric crystal 308. Energy is fed from the output circuit 304 inductively through coil 310, the midpoint of which may be grounded as illustrated, to electrodes 312, 314 of crystal 308. The output electrodes of the crystal 308 are connected to coil 316 whose impedance is preferably so chosen as to match the output impedance of the crystal 308. Coil 316 is coupled to the input circuit 306 causing the necessary feedback for continued oscillation generation at harmonic frequencies of the crystal. To prevent electrostatic transfer of energy between coil 316 and the inductance coil of the tuned input circuit 306, a grounded shield 320 is provided, and similarly, static shield 322 prevents or assists in reducing capacitive transfer of energy from the crystal electrodes 312, 314 to the output electrodes 322, 324 of crystal 308.

For deriving odd harmonic output energy from the system as shown, coil 330 is provided.

If desired, the various output coils such as the coils 310 and 330 may be electrostatically screened from each other by the use of suitable screening means such as shield 320 of Figure 3 or screen 202 of Figure 2.

Having thus described my invention, what I claim is:

1. A constant frequency oscillation generator for generating energy of harmonic frequencies relative to the fundamental thickness frequency of a piezo-electric crystal comprising a tube having an output circuit and an harmonically tuned input circuit, a piezo-electric crystal, a pair of electrodes for said crystal connected to points in said output circuit between which there occurs only a portion of the total oscillation voltage developed in said output circuit, whereby said crystal is stimulated to vibrate piezo-electrically, and, another pair of electrodes for said crystal connected to points in said tuned input circuit, the impedance between said points being so chosen as to match the output impedance of said crystal, said tuned input circuit being tuned to a harmonic frequency of the natural fundamental thickness vibration frequency of said crystal.

2. A constant frequency oscillation generator comprising a tube having an inductive output circuit, a parallel tuned circuit connected between the input electrodes of said tube, a piezoelectric crystal, means for connecting a pair of electrodes of said crystal to points in said output circuit between which there occurs only a portion of the total oscillation voltage developed in said output circuit, means for coupling another pair of electrodes of said crystal to said tuned circuit, said tuned circuit being tuned to a harmonic frequency relative to the fundamental thickness vibration frequency of said crystal, and means for preventing the capacitive transfer of energy from said inductive output circuit to said input circuit.

3. A crystal controlled oscillation generator comprising a tube having an anode a cathode a grid and a screen grid, means for grounding the screen grid for high frequency currents, an inductive output circuit connected between said anode and cathode, a parallel tuned circuit connected between said grid and cathode, a piezoelectric crystal, means for connecting a pair of electrodes of said crystal to points in said output circuit between which there occurs only a portion of the total oscillation voltage developed in said inductive output circuit, means for inductively coupling another pair of electrodes of said crystal to said parallel tuned input circuit, means for reducing the capacitive transfer of energy between said crystal electrodes, and means for reducing the capacitive transfer of energy through said inductive coupling.

4. In an oscillation generator, an electron discharge device having a screen grid, means comprising a low impedance alternating current path connecting said screen grid to ground, a tuned input circuit and an output circuit for said device, at least one portion of said output circuit being constituted by an inductive element, a piezo-electric element having two pairs of electrodes, means for electrostatically shielding one pair of electrodes from the second pair, said piezo-electric element being capable of vibration at a frequency with respect to which the frequency characteristic of the input circuit is an odd harmonic, one pair of electrodes of said piezo-electric element being connected to points of low alternating potential difference on the inductive element of said output circuit, and means for inductively transferring energy from the second pair of said electrodes to said input circuit, the last said means being adapted to efficiently stimulate the oscillatory action of said generator at an odd harmonic frequency relative to the frequency at which said piezo-electric element is caused to vibrate.

JAMES L. FINCH.